June 9, 1925.
L. HOWE
1,541,502
DRIVE FOR MOTOR TRUCKS
Filed Nov. 21, 1922
3 Sheets-Sheet 2
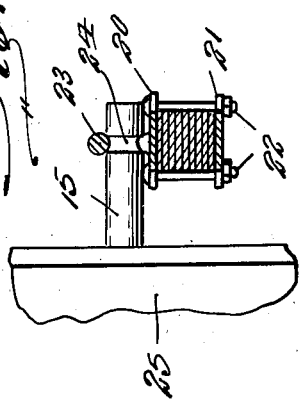
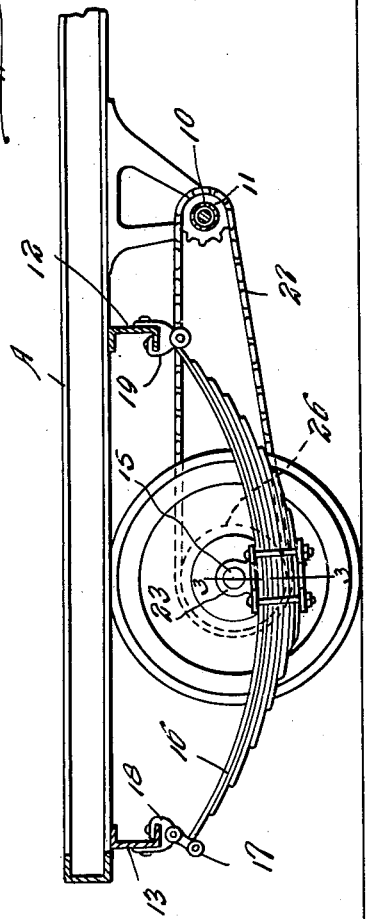
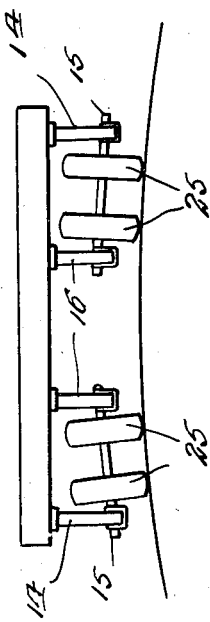
Witnesses:
F. L. Fox
N. Berman
Leslie Howe,
INVENTOR.
BY Clarence A. O'Brien
ATTORNEY.

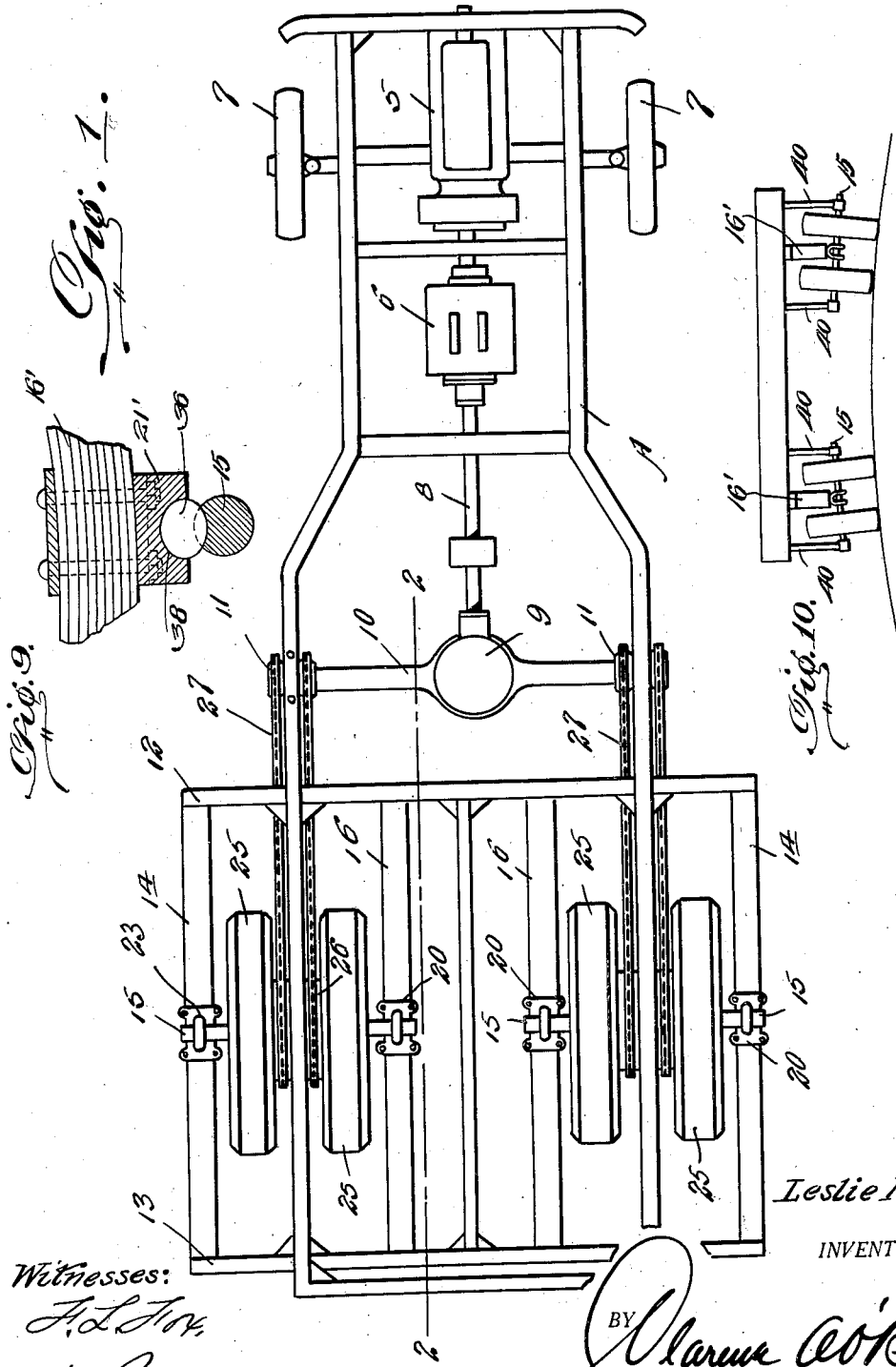

June 9, 1925.
L. HOWE
1,541,502
DRIVE FOR MOTOR TRUCKS
Filed Nov. 21, 1922   3 Sheets-Sheet 3
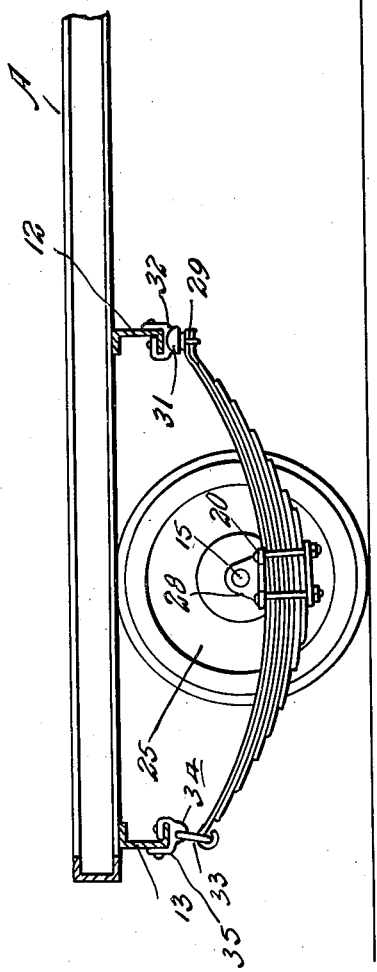
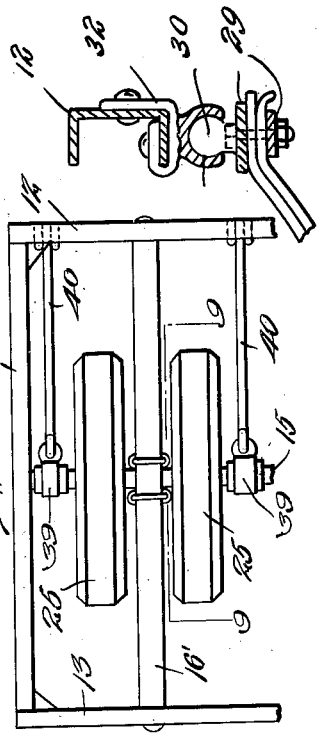
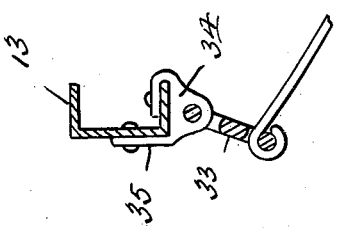
Leslie Howe,
INVENTOR.
ATTORNEY.

Patented June 9, 1925.

1,541,502

UNITED STATES PATENT OFFICE.

LESLIE HOWE, OF KENTON, OHIO.

DRIVE FOR MOTOR TRUCKS.

Application filed November 21, 1922. Serial No. 602,408.

*To all whom it may concern:*

Be it known that I, LESLIE HOWE, a citizen of the United States, residing at Kenton, in the county of Hardin and State of Ohio, have invented certain new and useful Improvements in Drives for Motor Trucks, of which the following is a specification.

My invention relates to improvements in motor truck drives, and has for the primary object thereof, the provision of such a device that will effectively overcome a number of undesirable factors now present in the conventional type of motor truck.

It is a well known fact that motor trucks and other heavy types of vehicles such as motor buses and the like, occasion untold damage to concrete and macadam roads cutting large ruts and wearing grooves therein.

Further, it has been discovered that this type of vehicle, and especially those employing the solid rubber tired wheels, have a great tendency to wear away the tires of the wheels upon the inner side thereof. This is due to the fact that practically all roads are slightly crowned, and the wheel carrying axles of the trucks being substantially rigid, the full width of the tire does not contact the road surface but only the inner portion thereof.

It is therefore, the main object of this invention to provide a drive for motor trucks, that will effectively overcome the above mentioned undesirable features now found in the conventional type truck.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a top plan view of a motor truck frame with my improved drive associated therewith.

Figure 2 is a fragmentary longitudinal cross sectional view upon the line 2—2 of Figure 1.

Figure 3 is a fragmentary vertical sectional view taken upon the line 3—3 of Figure 2.

Figure 4 is a view similar to Figure 2 of a slightly modified form of the invention.

Figures 5 and 6 are enlarged detailed cross sectional views of the mounting for the ends of the supporting spring shown in Figure 4.

Figure 7 is what may be termed a diagrammatic view of the rear of a truck, showing the relative position that the driving wheel therefor will assume upon the surface of the roadway.

Figure 8 is a fragmentary top plan view of a still further modified form of the invention.

Figure 9 is a cross sectional view upon the line 9—9 of Figure 8, and

Figure 10 is a view similar to Figure 7, disclosing the relative position that the driving wheels of the form of invention shown in Figures 8 and 9 will assume upon the surface of the roadway.

Referring to the drawings, and particularly to Figures 1 to 3 inclusive and Figure 7, my invention contemplates the provision of a motor truck frame A, which may be and preferably is, of a configuration as shown. The frame A includes chassis bars of the usual U channel construction, and this frame is adapted to support at its forward end, a motor 5, and transmission 6. Further, the front end of this frame carries the usual steering wheels 7 at opposite sides thereof. The propeller shaft 8 extends rearwardly as shown, and engages within a differential 9. This differential communicates with the usual shaft within the housing 10, and the ends of the shaft within this housing are each provided with a pair of spaced sprocket gears 11.

The parts above described may be, and preferably are of well known construction with the exception of the provision of the pairs of spaced sprocket gears 11 on the end of the driving shaft within the housing 10.

The rear end of the truck frame A and beneath the chassis bars thereof, is provided with a front and rear transversely arranged U frame bar 12 and 13, respectively, these bars are connected with the bars of the main frame in any manner desirable, and they form in reality, an auxiliary supporting frame upon the rear of the main frame A. The ends of each bar 12 and 13 extend outwardly of the side bars of the main truck frame, and secured between the extreme ends of these bars, are axle supporting springs 14 for supporting one end of an axle 15 at each side of the auxiliary frame occasioned by the provision of the bars 13 and 12. Further, these latter mentioned bars carry other axle supporting springs 16, therebetween, which springs are in spaced relation to the springs 14 at the outer ends of the bars and are adapted for supporting the inner ends of the said axles 15. As shown, this latter mentioned pair of axle supporting springs 16 is substantially centrally within the motor truck frame A.

As more clearly shown in Figure 2, the rear end of each of the springs 14 and 16 have pivotally connected thereto, links 17, which are pivotally secured at their upper ends to brackets 18, rigidly secured to the rear transverse U bar 13 of the auxiliary frame. The forward ends of the springs are pivotally secured to brackets 19, which are also rigidly attached to the front U bar 12 of the said auxiliary frame. The leaves forming the springs 14 and 16, are centrally secured together by upper and lower plate members 20 and 21 respectively, which plate members are secured together upon the leaves of the springs, by bolt and nut connections 22. The upper plates 20 upon the springs have centrally formed thereon, vertically projecting rings 23, and engaging within these rings are the opposite ends of the before described axles 15. Adjacent the outer ends of these axles 15 the same are provided with annular grooves 24 adapted to be encircled by the said rings 23 of the upper spring securing plates 20.

Each axle 15 has freely rotatably mounted thereon, a pair of spaced drive wheels 25, these wheels being positioned upon opposite sides of the channel bars forming the main frame A and further, substantially at both sides of the front steering wheel 7, when these wheels 7 are in an unturned position, and parallel with the side bars of the frame A as shown in Figure 1.

The adjacent sides of each pair of traction wheels 25 carry relatively large sprocket gears 26, which sprocket gears upon each axle are in alinement with the spaced smaller sprocket gears 11 upon the opposite ends of the above described shaft within the housing 10. Between alined gears 26 and 11, are sprocket chains 27 for rotating the said driving wheels 25 upon the axles 15.

In view of the above description, it will at once be understood that the driving wheels 25 will assume a position upon the crowned surface of the roadway as shown in Figure 7, this position of the wheel being occasioned in view of the specific supporting means for each axle 15. It will also be readily understood that the weight of the truck is evenly distributed upon all four of the driving wheels 25, this being occasioned in view of the fact that each axle 15 is supported by the springs 14 and 16, the specific connection between the opposite ends of the axles and the springs allowing the axles to have a relative vertical rocking movement upon each spring.

In the modified form of the invention as shown in Figure 4, the ends of each of the axles 15 are rigidly supported or secured within a bracket 28 carried by the upper plate 20 of the spring leaf securing clamps. In this form of the invention, provision is made for allowing a wide swinging movement of the springs 14 and 16 in contradistinction to the rocking movement of the axles 15. This is accomplished by securing to the forward end of each of the springs, a two-piece clamp 29, the upper section of which has formed thereon, a knob or ball 30. Each of these balls 30 is to be received within a socket 31 formed upon clamps 32, which are rigidly secured in their proper place to the forward upper U channel bar 12 of the auxiliary frame. The rear end of each of the springs 14 and 16 are loosely connected to one end of a link 33, the upper end of each link being loosely secured within a bracket 34 formed upon clamps 35, which are rigidly secured upon the rear auxiliary frame bar 13, and in alinement with their cooperating clamp 32 upon the front auxiliary frame bar 12. The connection between the upper end of the links 33 and the brackets 34, is such as to allow what may be termed a universal swinging movement of the links, and it will be therefore seen that in view of the specific connections for the ends of the springs, fully shown in Figures 5 and 6, the springs 14 and 16 in the modified form of the invention will be allowed a wide swinging movement, between the frame bars 12 and 13 for permitting the driving wheels 25 to assume a position upon the crowned roadway as shown in Figure 7.

In the still further modified form of the invention as shown in Figures 8, 9 and 10, there is employed a swinging supporting spring for each axle 15. In this instance, the spring is designated by the numeral 16′, and is supported between and secured at its opposite ends to the auxiliary frame bars 12 and 13, and the spring for each axle is positioned inwardly of the outer ends of the auxiliary frame bars and directly beneath each side bar of the main truck frame A. In this arrangement, the axles 15 have formed upon the upper surface thereof, and intermediate the opposite ends, a ball or head 36, which engages within a socket 38 formed within the adjacent surface of the lower spring clamp member 21'. In this modification, the bars 12 and 13 of the auxiliary frame may be interconnected at their opposite ends by cross bars 13', and in view of the ball and socket connection between each axle 15, and spring 16', it will also be seen that the driving wheels 25 thereon, together with their complementary axle will assume a position upon the surface of the roadway as shown in Figure 10.

For maintaining each of the axles 15 in their true horizontal position, between the frame bars 12 and 13, the ends of each axle have collars 39 positioned thereon, which collars are loosely connected to forwardly extending bars 40, which are in turn, loosely connected at their front ends in any manner desirable, to the front bar 12 of the auxiliary frame. It will therefore be seen that the weight of the motor truck, will be distributed, equally upon the four drive wheels of the truck, and in view of the floating axle construction, the entire surface of the usual tires on these wheels will have contact with the surface of the road, thereby wearing away evenly.

While I have herein shown and described, the preferred embodiment of the present invention, it is nevertheless to be understood that minor changes may be made therein, without departing from the spirit and scope of the invention as claimed.

What I claim as new is:—

1. A motor vehicle including a frame having parallel side frame bars, a pair of spaced transversely extending bars mounted on said side frame bars, said transverse bars extending beyond each side of the frame, a pair of supporting springs mounted at each side of the vehicle frame having the ends connected with the transverse bars and arranged in spaced relation at each side of the side frame bars, supporting axles mounted on each pair of supporting springs in the central portion thereof between the transverse bars, and pairs of traction wheels mounted on each supporting axle between the respective springs of each pair, said supporting springs having a pivotal connection with one of said transverse bars, and a swinging link connection with the other of said transverse bars.

2. A motor vehicle including a frame having parallel side frame bars, forward and rear transverse bars mounted on said side frame bars in spaced relation, the opposite ends of said forward and rear transverse bars extending beyond the side frame bars, supporting springs pivotally connected at the forward end to the forward transverse bar, and having a swinging link connection at the rear end to the rear transverse bar, a pair of supporting springs being arranged in equal spaced relation at each side of each side frame bar, supporting axles carried by each pair of supporting springs in the central portion thereof, a pair of spaced driving wheels mounted on each supporting axle between each spring of a pair, and a driving shaft rotatably mounted on the frame forwardly of the forward transverse bar and having independent driving connection with the respective pairs of driving wheels, said drive shaft being mounted below the horizontal plane of the pivotal connection of the supporting springs with the forward transverse bar, so that the arc of movement of said supporting axle, relative to said driving axle and the pivotal connection of the spring with the forward transverse bar will be substantially equal.

In testimony whereof I affix my signature.

LESLIE HOWE.